(12) United States Patent
Lee

(10) Patent No.: US 6,663,810 B1
(45) Date of Patent: Dec. 16, 2003

(54) METHOD FOR INJECTION MOLDING HELICAL AND STRAIGHT GEAR

(75) Inventor: Keung Lee, Shatin (HK)

(73) Assignee: New Bright Industrial Co., Ltd., Kowloon (HK)

( * ) Notice: Subject to any disclaimer, the term of this patent is extended or adjusted under 35 U.S.C. 154(b) by 0 days.

(21) Appl. No.: 09/712,975

(22) Filed: Nov. 16, 2000

Related U.S. Application Data

(62) Division of application No. 09/293,928, filed on Apr. 19, 1999, now Pat. No. 6,338,289.
(60) Provisional application No. 60/087,683, filed on Jun. 2, 1998.

(51) Int. Cl.[7] ............................................. B29C 45/44
(52) U.S. Cl. .................... 264/219; 264/318; 264/328.1; 264/334; 425/556; 249/59
(58) Field of Search ................................ 264/219, 318, 264/328.1, 334; 425/556, 577, DIG. 58; 249/57, 59

(56) References Cited

U.S. PATENT DOCUMENTS

| | | | |
|---|---|---|---|
| 2,767,438 A | * 10/1956 | Pingel | ........................ 29/893.3 |
| 3,150,222 A | * 9/1964 | Blaustein et al. | ............ 264/318 |
| 3,694,127 A | * 9/1972 | Takahashi et al. | .......... 29/893.3 |
| 3,730,664 A | * 5/1973 | Hultgren | ...................... 425/338 |
| 3,891,367 A | * 6/1975 | Signora | ...................... 29/893.3 |
| 4,139,176 A | * 2/1979 | Wundsch | ...................... 164/345 |
| 5,012,691 A | * 5/1991 | Bertot | .......................... 249/59 |
| 5,906,837 A | 5/1999 | Link et al. | |
| 5,908,067 A | * 6/1999 | Carr | ............................. 164/312 |
| 6,165,400 A | 12/2000 | Hinzmann | |
| 6,338,289 B1 | * 1/2002 | Lee | ........................... 74/421 R |

FOREIGN PATENT DOCUMENTS

JP 06-31373 * 2/1994

OTHER PUBLICATIONS

Rosato et al., Injection Molding Handbook, 2$^{nd}$ edition, Chapman &Hall, International Thomson Publishing, pp. 324–327, 1995.*

* cited by examiner

*Primary Examiner*—Jill L. Heitbrink
(74) *Attorney, Agent, or Firm*—Nixon & Vanderhye P.C.

(57) ABSTRACT

A helical gear is disclosed that is formed by an injection molding process in which the mold cavity is formed of mirror finished hardened stainless steel. The helical gear is disclosed in a gear box that entirely encase the gears, and may be integral with the housing of the toy. Furthermore, an "L" axle for gears is disclosed that provides a straight shaft portion that extends through the axle bearing aligned with the centerline of the gear and a bent portion that is seated in a slot recess in the wall of the gear box.

4 Claims, 10 Drawing Sheets

METHOD FOR INJECTION MOLDING HELICAL AND STRAIGHT GEAR

RELATED APPLICATION

This application is a division of U.S. application Ser. No. 09/293,928, filed Apr. 19, 1999, now U.S. Pat. No. 6,338,289.

This application is related to commonly-assigned U.S. provisional application Serial No. 60/087,683 entitled "Gear Box Having Plastic Helical Gears and L-Shaped Axles", filed Jun. 2, 1998, which is incorporated by reference in its entirety.

FIELD OF THE INVENTION

The field of the invention relates to the field of plastic gears and plastic gear boxes for gears, and, in particular, to the formation of plastic helical gears and gear boxes utilizing those helical gears for toys and other small motorized devices.

BACKGROUND AND SUMMARY OF THE INVENTION

There is a continuing and long-felt need for inexpensive, plastic gears for use in toys and similar applications. Gears transmit rotational movement and torque forces. Gears may be used to convert the high-speed, low torque output of a rotating electric motor to a low-speed, high torque output of a wheel drive shaft for a toy car. They also may be used to move the mechanical arms of, for example, a toy construction crane. Gears for toys should be safe, inexpensive and wear resistant. Plastic gears are suitable for toys because they are safe as they do not have sharp edges (as do metal gears); may be inexpensively formed by injection molding processes, and are tolerant of the dirt and wear encounter by toys, especially toy cars, trucks and construction vehicles.

There is also a long-felt need for an inexpensive helical gear formed by plastic injection molding. Helical gears can be used in conjunction with a worm gear to transmit rotation and torque from a rotating worm gear to a helical gear. Helical gears have a variety of applications, including engaging a worm gear mounted on the shaft of a small electrical motor to turn the gears of a gear box.

By using helical gears to engage a worm gear on a motor shaft, a motor is not constrained to be mounted perpendicular to the plane of rotation of the gears in the gear box. A motor with a spur gear must be mounted so that its output shaft is perpendicular to the plane of rotation of the gear. This constraint on the mounting of a motor having a spur gear may cause difficulties in arranging the motor and gear box in a small space, such as within a toy vehicle. A motor with a helical gear may be mounted parallel to the axes of rotation of the gears in the gear box. Having the flexibility to orient the motor in relation to the gears is particularly advantageous in a small toy vehicle where the spaces for mounting a motor are limited.

In addition, a helical gear may be used to reduce the rotational speed of the motor shaft to a lower speed of a wheel rotation, with fewer gears than would be practical without helical gears. Reducing the number of gears allows gear boxes to be more compact and have fewer components, than do prior gear boxes with many spur gears. With a standard pair of spur gears their relative speeds of rotation depend on the ratio of the number of gear teeth on each gear. The number of gear teeth on a spur gear depends on the diameter of a gear. A helical gear may be rotated by (or may rotate) a worm gear, which has a small diameter relative to a spur gear. The pitch (or angle of the gear teeth on the helical and worm gears relative to the screw axis) determines the speed of rotation of the helical gear being driven by the worm gear. A relatively-small screw and helical gear assembly may be used to dramatically reduce the rotational speed of a motor down to a speed suitable for the wheels of a toy car. By using a relatively-small pitch angle, e.g., 6 degrees, on the helical and worm gears, the rotational speed reduction from the rotating speed of the motor gear to that of the driven helical gear, may be much greater than could be practically accomplished with a pair of spur gears.

Helical gears have been difficult to form by plastic injection molding. To form a gear by injection molding, a gear cavity must be formed in the mold. Liquid plastic is rapidly injected into the mold cavity and the plastic is allowed to solidify during a cure period. Once the plastic has hardened, the mold is split apart and the plastic gear removed. This process of injecting liquid plastic curing, opening the mold and ejecting a gear is repeated rapidly in a typical commercial injection mold apparatus. Difficulties arise during the molding process such as: the plastic flows into surface imperfections of the mold cavity; the metal that forms the mold cavity may corrode; the volume of plastic injected in the mold cavity may be excessive; the cooling period needed to hardened the injected plastic may be inadequate; and the ejection process may be too fast for helical, gears.

These and other problems with the plastic injection process have in the past made it difficult to form helical gears at sufficiently fast production rates. The production rates must be fast to satisfy the demand for plastic gears and to reduce the cost of manufacturing these gears. If the production speed is too slow, then the cost to manufacturer plastic gears, especially helical gears, becomes greater than the cost to use metal gears or other alternatives to plastic gears. If the production of plastic gears is prone to malformed gears or gears that do not properly eject from the mold, then the cost to make the gears becomes excessive. In the past, helical gears have not been made from plastic because the production rate has been inadequate to meet the demand for gears used in toys and the cost has been greater than the cost of metal gears or of other alternatives to plastic gears. Accordingly, there has been a long-felt demand for plastic helical gears.

In the present invention, a helical gear is formed by an injection molding process in which the mold cavity is formed of mirror finished hardened stainless steel. The mirror finish prevents the plastic of the gear from sticking to the mold cavity, and the stainless steel is corrosion resistant. The injection of plastic is carefully metered to dose the proper amount of plastic and to apply the proper pressure to the plastic. By properly metering the plastic injection the invention avoids the problems associated with over-packing the mold cavity with plastic, such as gear warpage and excessive internal stresses in the gears.

Once the plastic is injected, the cooling period allotted to a helical gear is longer than the cooling period for straight gears. Moreover, the pin is balanced and straight such that the gear slides smoothly off the pin as the gear ejects from the mold. A sleeve that forms a collar to the ejection pin slides along the pin to eject the gear from the mold. The ejection of a helical gear is conducted at a slower speed than the ejection of the straight gears. Helical gears have gear teeth that are at an angle with respect to the gear axis. The ejection of gears from a mold is in the direction of the axis of the gear. For a straight gear, the ejection is a straight, non-rotating movement in the direction of the gear axis. To eject a helical gear the gear must rotate slightly as the gear moves out of the mold, to accommodate the angled gear teeth. To allow the helical gear to rotate as it is ejected, the gear must be more slowly ejected from the mold than the ejection speed used for straight gears. If the helical gear is ejected too quickly, the gear teeth may be damaged or stripped off. By slightly reducing the ejection speed of the gears and implementing the other features of the invention, helical gears can formed by plastic injection molding at production rates sufficient to produce low-cost gears for toys and other mass-produced products.

There is also a long-felt need for gear boxes that may be conveniently arranged in or integrated with toy vehicles and other small devices. A gear box transmits rotation and torque through an assembly of intermeshing rotating gears. An input shaft to the gear box transmits a drive rotation to the gears and to an output shaft(s) from the box. As the drive rotation causes the intermeshing gears in the box to rotate, the rotational speed of each of the gears will vary depending on the gear teeth ratios of each pair of gears. The torque and rotational speed of the output shaft will be in proportion to the input shaft speed and torque, where the proportional relationship depends on the arrangement of gears between the input and output shafts.

An embodiment of the present invention is gear boxes that entirely encase the gears, so that dirt and dust cannot easily come between the gears. The gear boxes may also be integral with the housing of the toy to minimize the components in the toy and to reduce manufacturing costs. If an integral gear box is not practical, then an encasing gear box may be designed to fit easily in the housing of the toy adjacent to the wheels, mechanical arm or other component to be turned by the gear box. Accordingly, the gear boxes of the present invention seal the gears against dirt and dust, and may be integrated into the plastic housing of a toy or for a separate housing mounted within the toy.

Furthermore, the axles used for gears have been short metal shafts that slide through an axle bearing in the gear and are supported by a pair of axle support posts on either side of the gear. The plastic support posts used in toys tend to flex to allow the metal gear shaft to snap into place in the gear box. These gear shafts have a tendency to pop out of their support posts after the toy has been in play. Another technique for mounting an axle shaft is to slide the shaft through an aperture in one or both of the support posts. This technique for mounting an axle shaft suffers from the problem that the axle may slowly slide out through the aperture in the support post as the toy is played with. Whether the axle pops or slides out of place, such movements of an axle in a gear box will cause the gears to become misaligned and render the gear box and toy inoperative. Accordingly, there has been a long felt need for a better axle for use in plastic gear boxes used in toys and other applications.

The present invention also includes an "L" axle, that may be incorporated into a gear box. The "L" axle is an advance over prior straight axle shafts used for plastic gears. The L-axle provides a straight shaft portion that extends through the axle bearing aligned with the centerline of the gear. The straight section of the L-axle may have a free standing end to receive the gear(s) during assembly of a gear box. The opposite end of the L-axle is bent at, for example, a right angle. The bent portion of the axle is seated in a slot recess in the wall of the gear box. A support groove in the slot recess tightly holds the bent portion of the axle in place. The slot recess and groove rigidly hold the axle such that the axle does not rotate or slide axially during use. Accordingly, the "L" axle solves the problems experience with prior straight shaft axles, which problems included axle rotation and sliding of the axle which caused the gears to fall out of alignment within the gear box.

The invention provides several advantages for gears, transmission assemblies, e.g., gear boxes, and gear linkages over the prior art including, but not limited to: improved safety, better resistance to dirt and grime, fewer components, especially metal components, lower manufacturing costs, and compact arrangements of motor and transmission gear assemblies. Safety is improved, especially for toys, because the invention reduces the number of small gears needed for a transmission assembly and thereby reduces the number of components that may be separated from a toy and inadvertently swallowed by child. Safety is also improved by having helical gears formed of plastic, which is less likely to cut a child, than would metal helical gears. The invention resists dirt and grime by encapsulating gears and motors in gear boxes. The lower manufacturing costs flow from forming helical gears from plastic, rather than metal, and reducing the number of gears needed by utilizing helical gears. In addition, compact arrangements of motors and transmission gear assemblies is achieved because the use of helical gears allows the motor to be arranged adjacent to the gear assembly.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which.

DETAILED DESCRIPTION OF THE DRAWINGS

Figure 1:
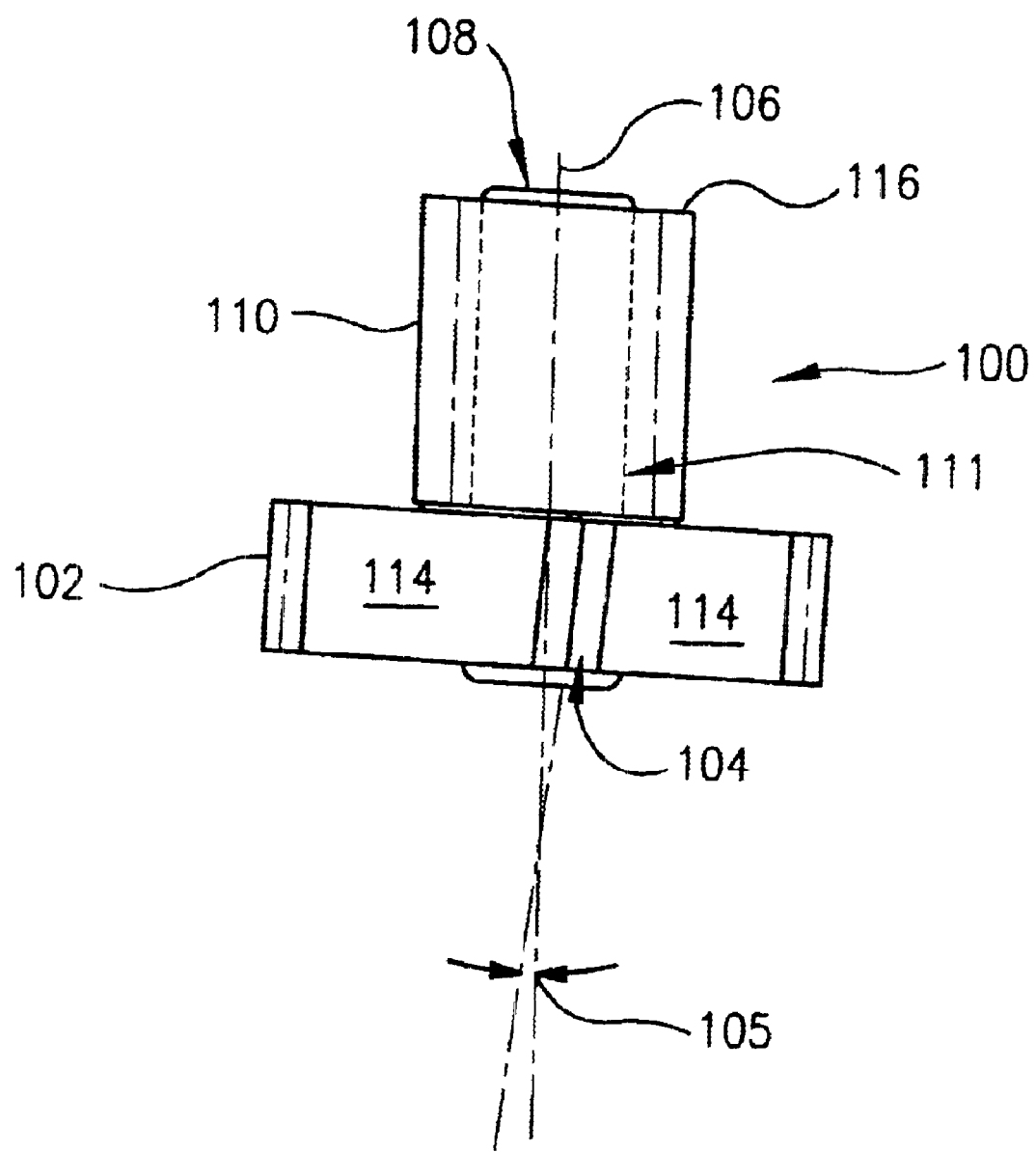
FIG. 1 is a side view of a plastic helical gear.

FIG. 1 shows a side view of a helical gear 100 formed of injected plastic. The helical gear disk 102 has helical gear teeth 104 that are slanted at an angle 105 from the gear axis 106 of, for example, 6 to 12 degrees. The pitch angle of the gear teeth, as well as the number of size of the gear, may be selected by the gear designer to suit the application of the helical gear. For example, the angle of the helical gear teeth may match the pitch of a worm gear, to be engaged by the helical gear. In addition, the helical gear may have a shaft hole 108 to receive a gear axle shaft. The helical gear may also include an integral second gear disk 110 with a second set of gear teeth that are standard, i.e., straight and non-helical. The diameter of the second gear 110 disk may be about one-half of the diameter of the helical gear disk 102.

Figure 2:
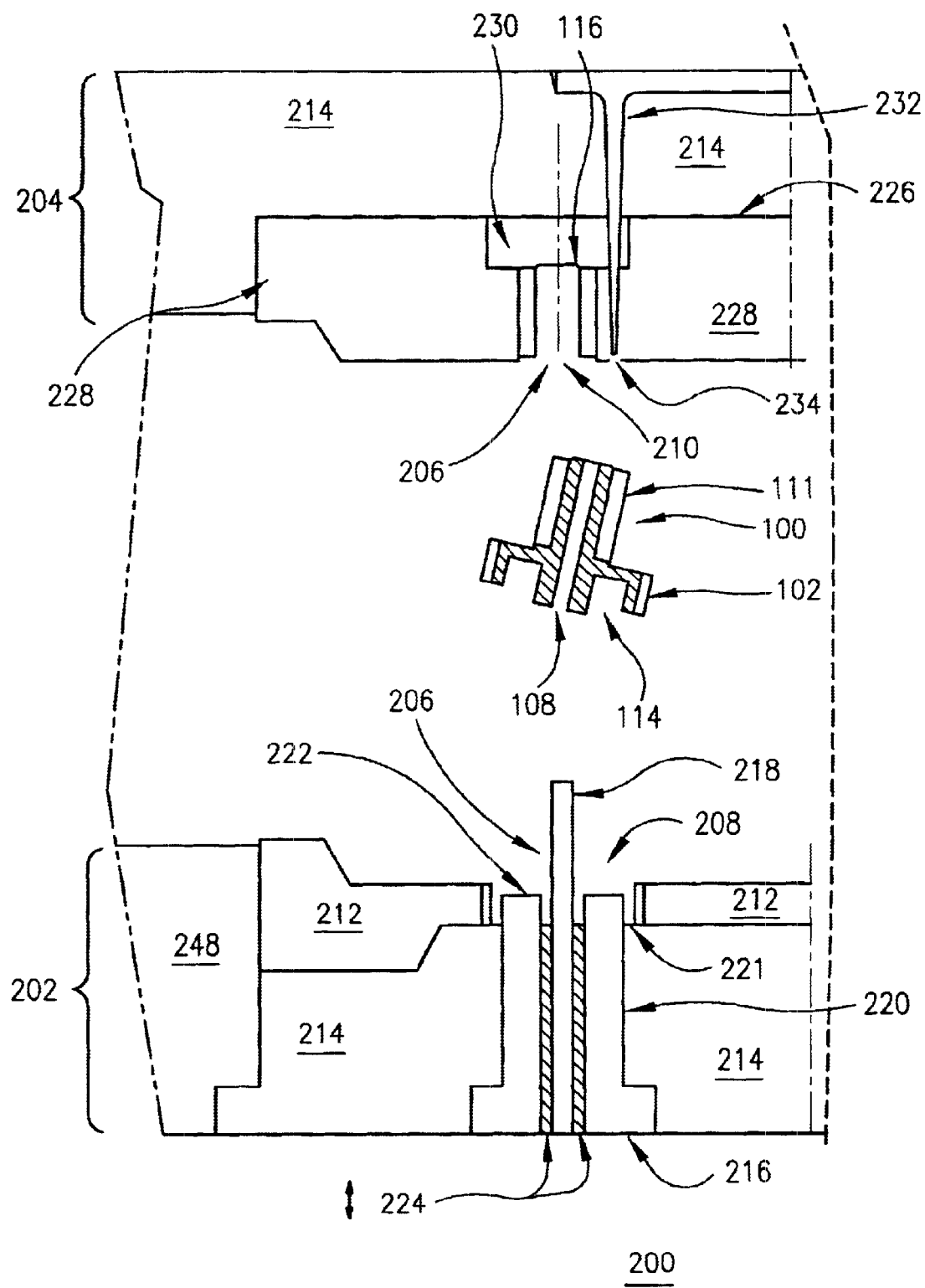
FIG. 2 is a cross-sectional diagram of a mold plastic injection molding of a helical gear, where the mold is one of four molds in a mold assembly.
Figure 3:
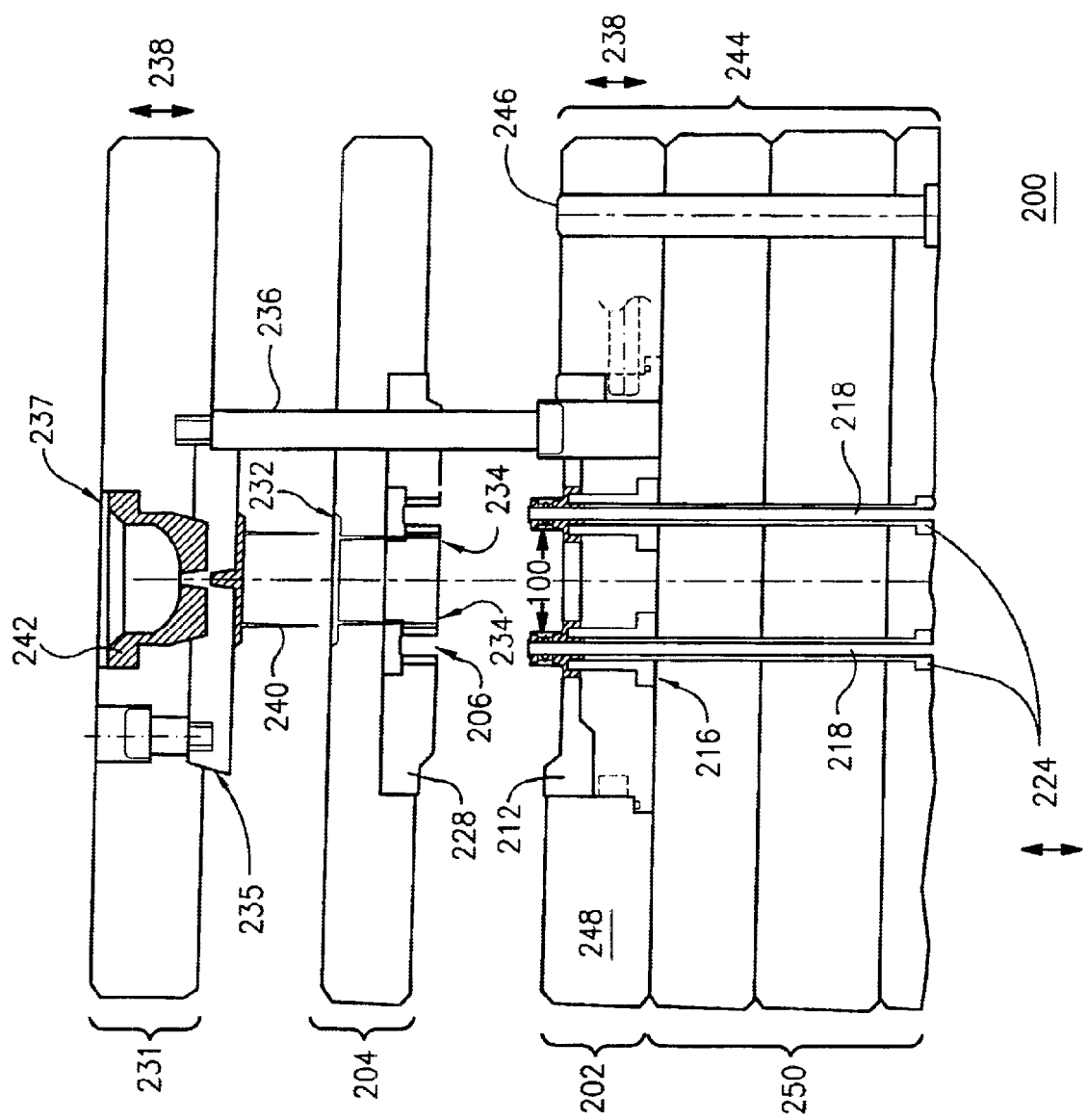
FIG. 3 is a cross-sectional view of a plastic injection mold assembly showing two of four gear molds.

FIGS. 2 and 3 show an injection molding apparatus 200 for forming helical gears 100 from plastic. FIG. 2 shows a helical gear 100 being ejected from a portion of an injection molding apparatus 200. The quarter section of the molding apparatus shown in FIG. 2 includes a moving mold 202 and a stationary mold 204, which when mated together, form a mold cavity 206 for the helical gear 100. In the example shown here, the helical cavity section 208 in the moving mold 202 defines the helical gear portion 102, and the stationary mold 204 has a straight gear teeth cavity section 210.

The moving mold section 202 is an assembly of mold components, including a helical gear mold plate 212, and a circular back plate 214 which supports the helical gear mold plate. The back plate and mold plate fit in a cavity of a support plate 248, shown in FIG. 3. In addition, an annular post mold 216, and an axle shaft mold 218 extends through the moving section 202. The helical gear mold plate 212 includes a cavity 208 that defines the shape of the helical gear teeth 104 and the helical gear disk 102.

An annular recess 114 in the helical gear disk 102 is formed by the annular post 216 protruding from the moving mold section 202. The annular post 216 fits into an aperture 220 in the back plate 214 of the mold assembly. The nose 222 of the post 216 extends out from the back plate to define the recess 114 to be formed in the gear. In addition, the shape of the side of the helical gear is defined by a portion 221 of the back plate that is exposed to the mold cavity. The mold pin 218 defines the cavity for the gear shaft aperture 108 for the helical gear. The mold pin is held by a sleeve 224 in a center aperture of the annular post 216. To eject the gear 100 from the mold, the mold sections 202, 204 separate to open the mold, and sleeve 224 slides reciprocally along the pin and within the annular post 216 to push the gear from the open mold.

The stationary mold section 204 also includes a half-section of the gear cavity 210 that defines the straight gear teeth 111. In addition, the stationary mold section includes a back plane plate 214. The back plane plate 214 includes a recessed 226 which receives a circular mold plate 228 having the cavity 206 for the helical gear 100. In addition, the mold plate includes a plug 230 which caps the rear end of the cavity 206 for the gear. The plug 230 defines the rear edge 116 of the gear mold cavity 206.

A spout 232 forms a flow passage for liquid plastic and extends through the back plate 214, the plug 230 and the mold plate 228. The outlet 234 of the spout discharges into the helical gear cavity 208 of the moving mold section 202, when the mold half-sections 202, 204 are mated together. While FIG. 2 shows the moving and stationary mold sections 202, 204, respectively, separated from one another to allow for ejection of a formed gear 100, these two mold sections are brought together to form the mold cavity 206 for a gear.

FIG. 3 shows a complete mold assembly 200. The mold assembly is a group of stacked plates which, when brought together, form mold cavities 206 that form helical plastic gears. The top plate 231 includes an inlet port 237 to receive liquid plastic for injection into the mold cavity 206. The inlet port includes an injection nozzle 242 to direct liquid plastic into the spout 232. A seal 235 surrounding the inlet port 237 prevents liquid plastic from seeping out between the mold cavity and the stationary mold 204. As shown in FIG. 3, the top plate 231 and stationary mold 204 are separated (to allow for ejection of waste plastic from the runner 240 in spout 232), but in operation the two plates are brought together when liquid plastic is injected into the mold cavity. In addition, the top plate supports guide posts 236 which guides the reciprocal motion 238 of both the top plate 231 and the moving plate 202. Not shown are the mechanical devices which move the plates of the mold assembly during the plastic injection process. However, these mechanical moving devices are well known, and persons of ordinary skill in the art will find mechanical moving assemblies well suited for this purpose.

Some of the cross-hatched sections shown in FIG. 3 represent mold pieces of cured plastic. For example, the formed plastic gears 100 are shown as still being mounted on the annular post 216 of mold sections 202, 204. In addition, the plastic remaining in the spouts 232 is removed from the spouts when the top plate 231 separates from the stationary mold 204. This excess plastic in runner 240 is waste plastic that is discarded after each injection molding process.

The lower portion 244 of the mold assembly is a stack of plates held together by a post 246. In addition to the helical gear mold 212 with the helical gear cavity 208, and moving mold section 202, the plate assembly 244 includes a mold plate 248 within which seats the circular back plate 214 and the helical gear mold 212. In addition, three further back plates 250 (shown partially in FIG. 3) provide structural support to the mold assembly. Extending through the plates 250 and 248 are the pins 218 that also form the mold for the gear shaft aperture 108 in the helical gear 100. The ejector pin sleeves move reciprocally within the mold plates, to eject molded gears 100.

During operation of the injection molding process, the plates 231, 204, 248 and 250 are stacked together, one on top of each other, to begin the molding process. Liquid plastic is injected through the inlet 237 and through the inlet nozzle 242 so that liquid flows into the mold assembly, through the spouts 232, and into the mold cavity 206. The amount of liquid plastic injected into the mold assembly is precisely controlled to fill the mold cavity 206. Conventional computer controllers for injection molding devices are suitable for accurately controlling the flow of liquid plastic into the mold cavity. A speed envelope may be prescribed in the controller to specify the acceptable ranges of plastic flow rates and injection time for the plastic injection process. It is desirable to avoid adding excessive plastic into the mold cavity which might seep out between the plates and thereby hinder extraction of the helical gears.

Once the plastic has filled the mold cavity, the plastic is allowed to cure, such as for 12 seconds. At the end of the cure time, the mold plates are separated as shown in FIG. 3. The sleeves 224 for the mold pins 218 slide upward to push the plastic gears 100 from the mold. As gears slide out of the helical gear teeth mold 208, the gear rotates slightly because the (year teeth are a pitch angle to the axis of the mold pin. Accordingly, the gear is pushed out relatively slowly to prevent damage to the gear teeth or gear as it rotates during the ejection process.

To ensure that the molding process for the helical gear occurs smoothly and reliably, the mold pins 218 should be carefully balanced, straight, and aligned to ensure that the gear ejects smoothly from the mold. In particular, the mold pins should be entirely straight to ensure that the sleeves eject the gear straight along the pin axis. In addition, the mold is preferably formed of hardened stainless steel to minimize corrosion of the mold cavity 206 due to the plastic. Moreover, the mold cavity surfaces that are exposed to the plastic should have a mirror surface finish to minimize the sliding friction between the molded gear and the mold cavity as the gear is ejected from the mold.

Figure 4:
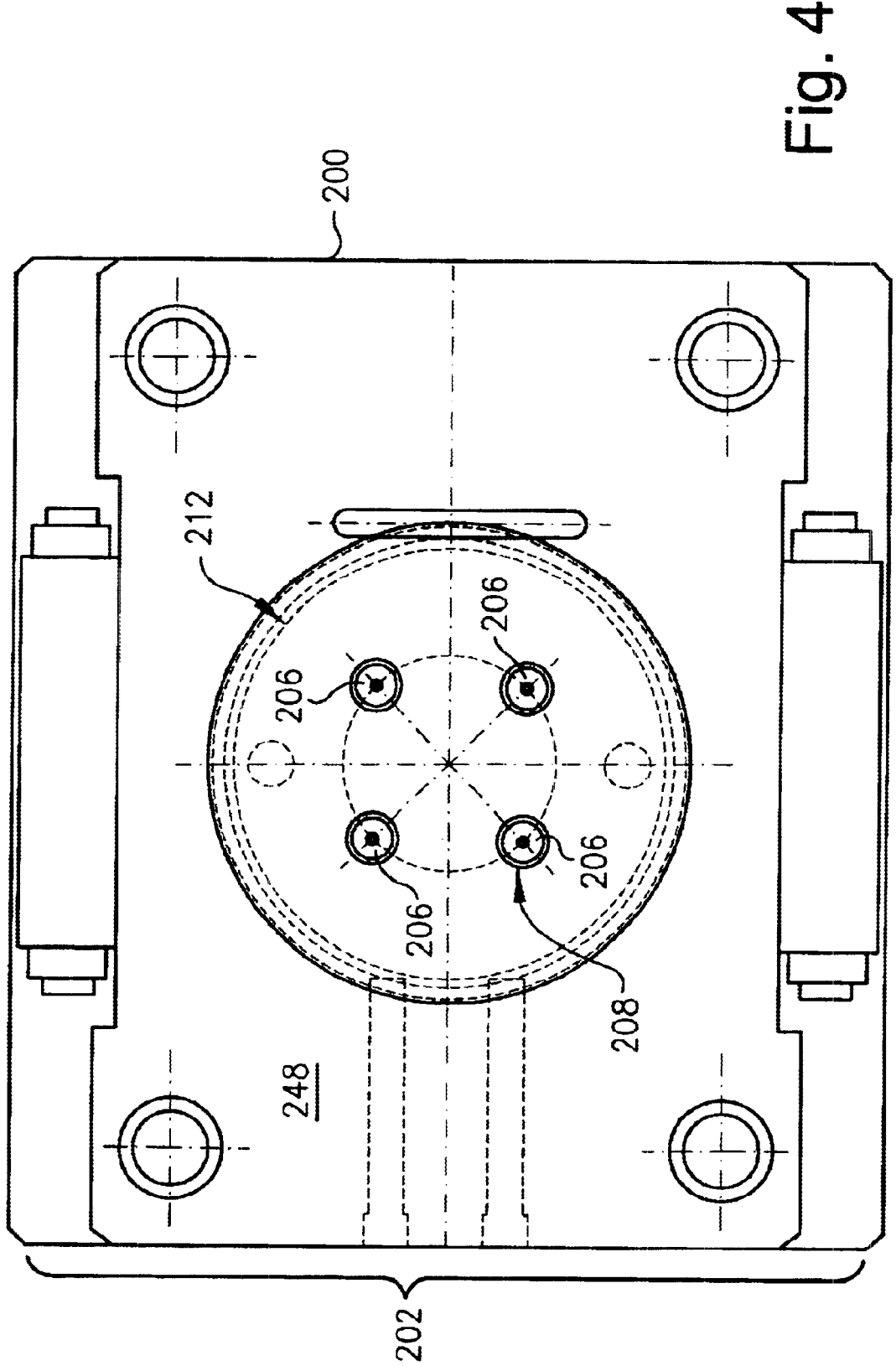
FIG. 4 is a bottom view of the mold assembly shown in FIG. 3.
Figure 5:
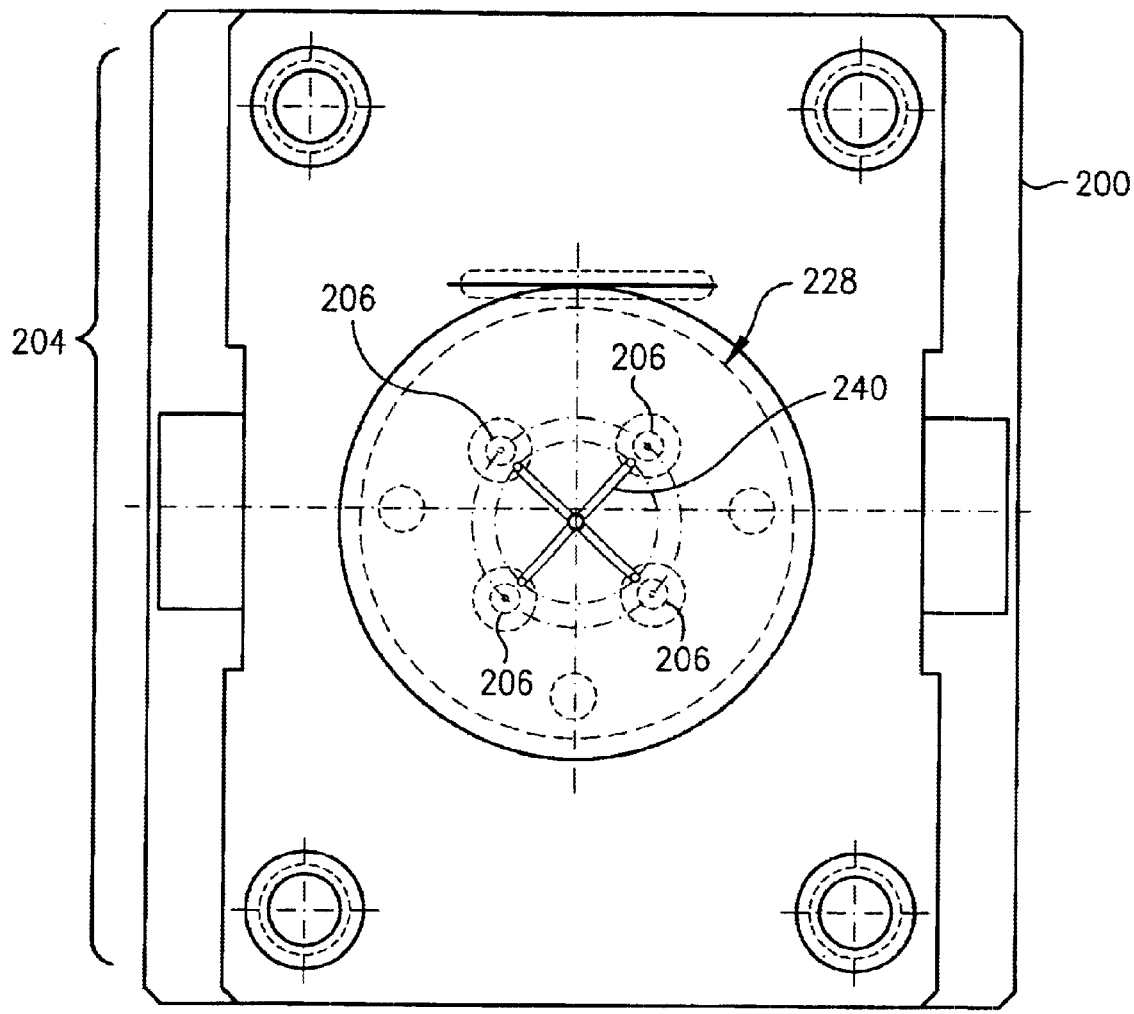
FIG. 5 is a top view of the mold assembly shown in FIGS. 3 AND 4.

FIGS. 4 and 5 show interior plan views of the mold assembly 200 from the perspective of the mold. FIG. 5 shows the mold surface of the back plane having a circular mold plate 228 and four mold cavities 206. These mold cavities contain the gear cavities for the straight gear side of a helical gear. In addition, hidden views of the spouts 232 (shown in FIG. 3) provide plastic flow passages from the inlet 237 to each of the gear mold cavities. FIG. 4 shows a plan view of the mold surface of the mold plate 212, which includes the mold cavities 206 with helical gear mold teeth cavities 208. The mold surfaces shown in FIGS. 4 and 5 are mated together to form a mold cavity for the helical gears.

Figure 6:
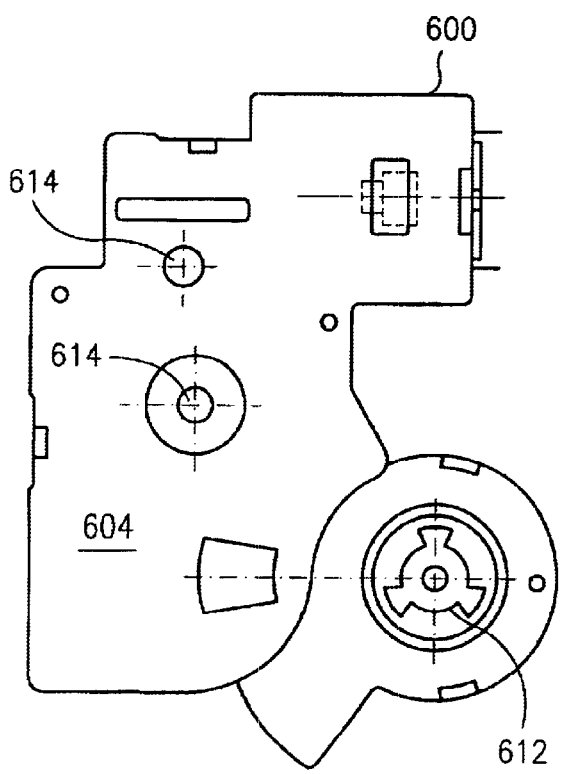
FIGS. 6 and 7 are side and top views of a large excavator arm gear box.
Figure 7:
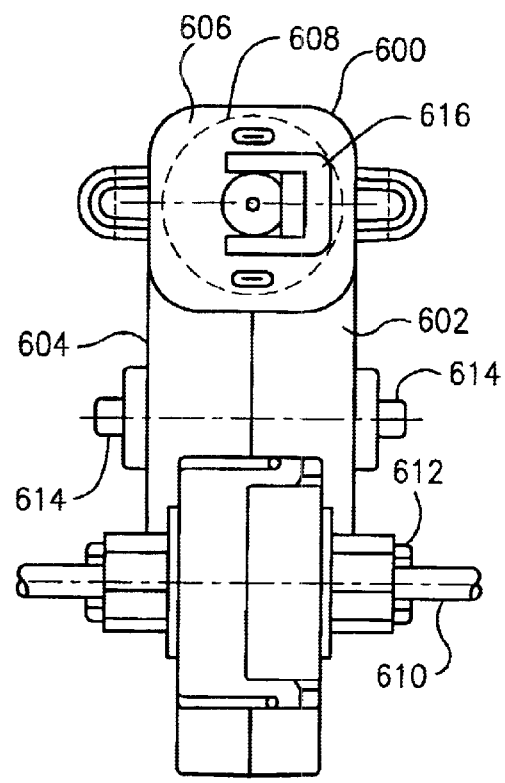

FIGS. 6 and 7 show side and top views of an exemplary gear box 600, which includes a helical gear of the type shown in FIG. 1. The gear box 600 seals an assembly of gears and motor to prevent dirt, water and other debris from getting between the gear teeth and interfering with the operation of the motor and gear box. The gear box may be formed of, for example, two plastic casings 602, 604 which, when sealed together, form the gear box. The casing may include a chamber 606 for an electric motor 608, and an output shaft 610 that may be coupled to a wheel axis or mechanical arm to be rotated. The output shaft may be keyed 612 as shown in FIG. 6. The interior of the casing walls may include bearing surfaces 614 to support the gear shafts the gears in the gear box. Similarly, the casing may include snap attachments 616 to hold the gear casing together.

Figure 8:
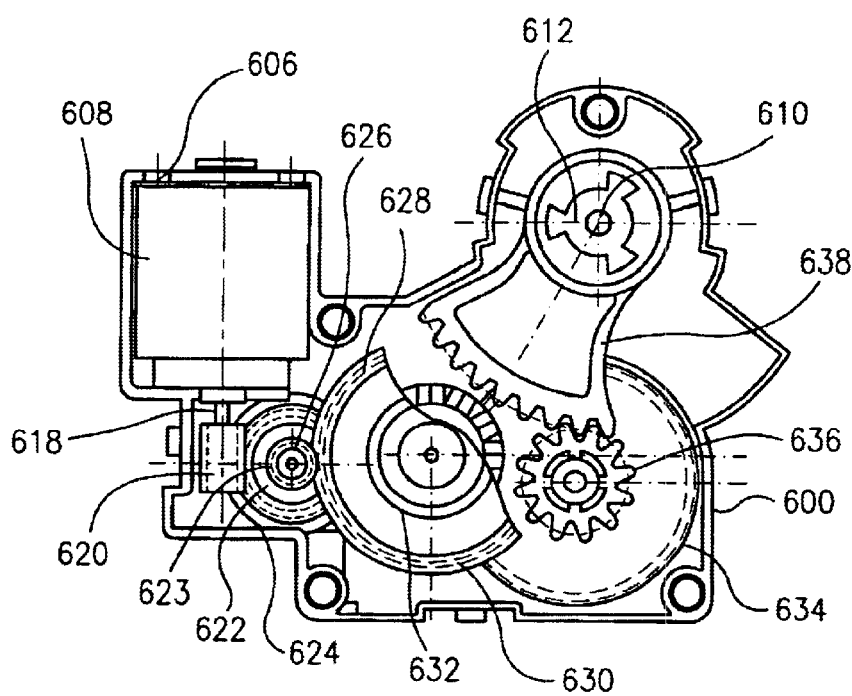
FIG. 8 is a cross-sectional view of the large excavator arm gear box shown in FIGS. 6 and 7.

FIG. 8 shows a gear casing 600 with the interior gear and motor 608 exposed. The motor 608 has an output shaft 618 and a worm gear 620 attached to the shaft. A helical gear 622 (similar to the helical gear 100 shown in FIG. 1) is rotatably engaged with the worm gear. The helical gear is mounted on a gear shaft 623. The helical gear 622 has helical gear teeth 624 that engage the high speed rotating worm gear on the motor. The helical gear teeth have a pitch angle to match the pitch of the teeth of the worm gear. The helical gear teeth 624 are arranged on a large diameter section of the helical gear. The helical gear 622 also includes a small diameter spur gear disk 626 to engage an outer diameter gear disk 628, of intermediary gear 630. The intermediary gear may also have a small diameter gear disc 632 which engages the outer diameter gear disk of another intermediary gear 634. The second intermediary gear 634 may have a small diameter gear 636 that engages a partial gear 638. The partial gear turns the output shaft 610. The sequence of gears 620, 622, 630 and 634 form a speed reduction assembly of gears that reduces the rotating speed of the electric motor to a relatively-slow rotational speed at gear 636 which is used to rotate through a narrow angle, e.g., 30 degrees, partial gear 638. In the embodiment shown in FIGS. 6 through 8, the partial gear 638 may be applied to turn shaft 610 through an angle of, for example, 30 degrees. A limited movement of 30 degrees may be used to rotate a mechanical arm, such as an arm of a crane in a toy construction vehicle. The gear box may have an output shaft that only rotates through a narrow range of degrees such as shown in FIGS. 6 and 7, or the gear box may have an output shaft that rotates completely around and drives rotating machinery such as the wheels of a toy car. The gear box shown in FIGS. 6 and 7 is an example of a separate gear box for housing an electric motor and a gear assembly. The gear box is separate from the toy and is housed within the toy.

Figure 9:
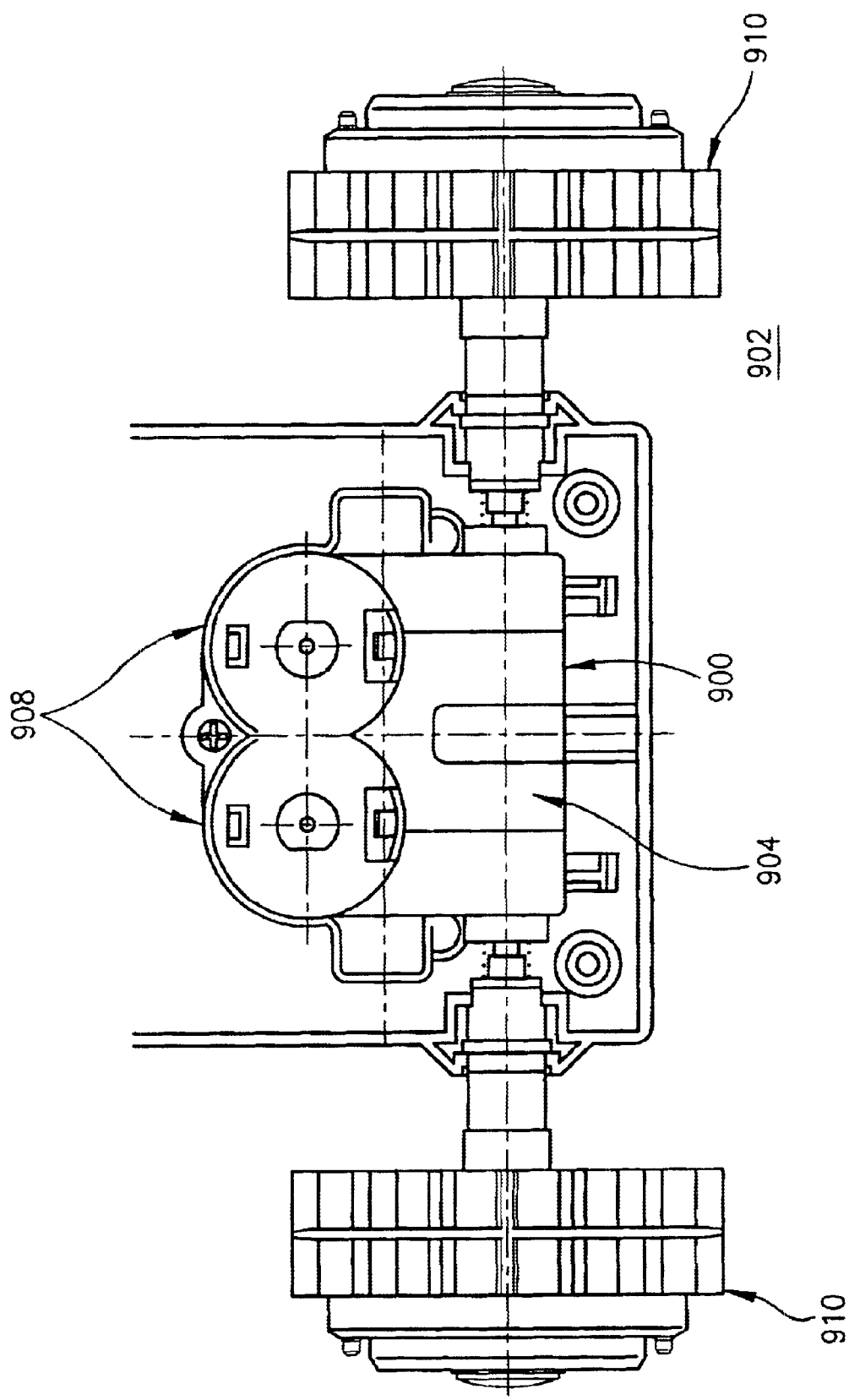
FIG. 9 is a bottom view of an integral driving gear box and a portion of the under-chassis of a toy bulldozer.
Figure 10:
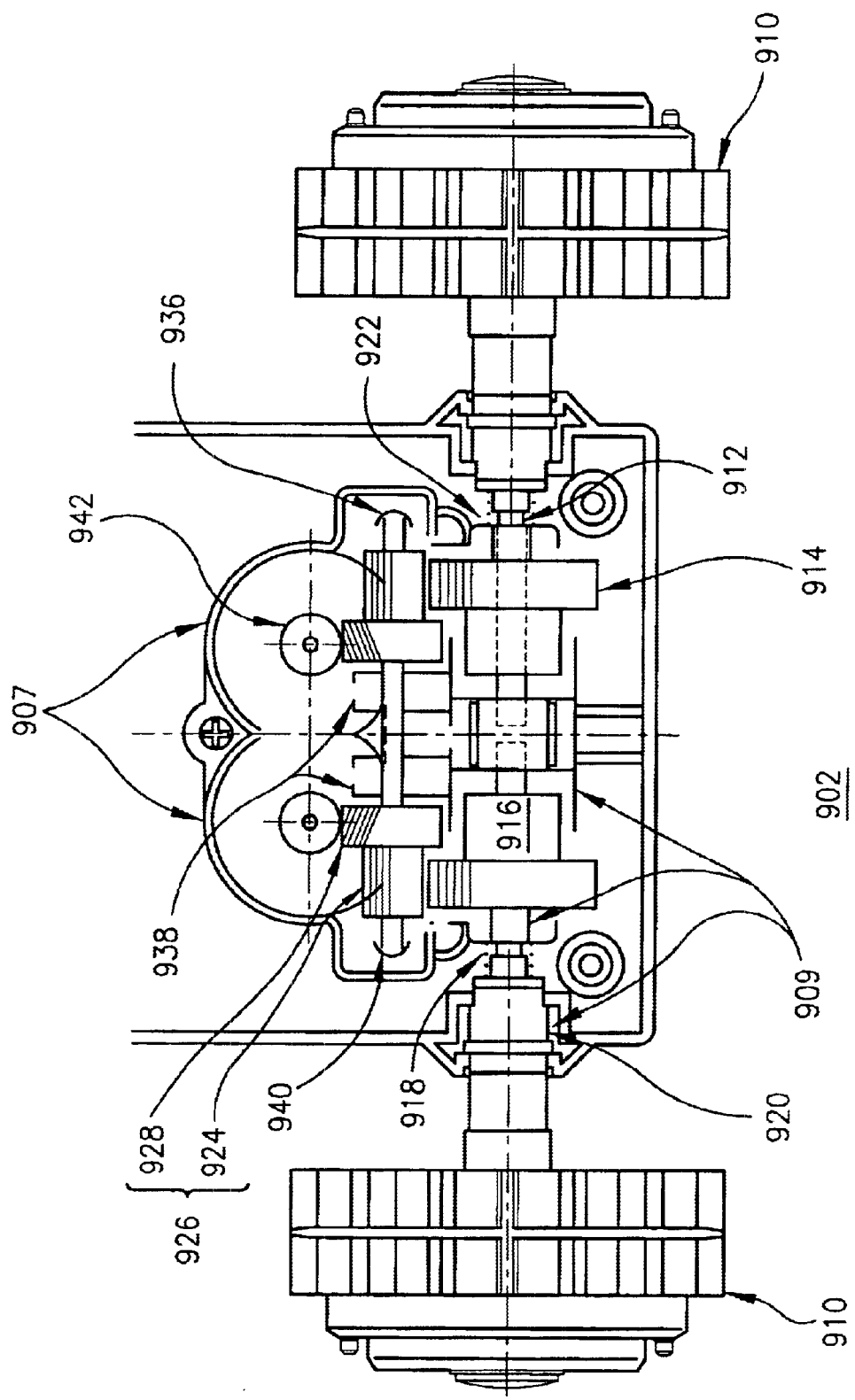
FIG. 10 is a bottom view of the driving gear box shown in FIG. 9, with the gear box cover removed.

FIGS. 9 and 10 shows a motor and gear housing 900 that is mounted within the chassis 902 of a toy vehicle, such as a bulldozer. The housing includes a housing cover 904 (shown in FIG. 9) that is screwed onto the under-chassis 902 of the vehicle. The chassis, as is shown in FIG. 10, has mounts 907 for the motor 908 and bearing surfaces 909 for the gearing and drive-wheels 910. The combination of the housing and under-chassis form a sealed container housing 900 for the gears and motor.

The wheels 910 are each mounted on a separate drive shaft 912 that extends into the casing towards either side of the gear box. Each drive shaft has a wheel 910 on one end and a drive gear 914 towards the other end. The drive gear engages the shaft 912 through an annular clutch 916 that allows the wheel to slip with respect to the rotation of the gear 914. A coil spring 918 biases teeth on the periphery of the clutch to engage slots in the rim of the drive gear. The clutch and spring allow the drive gear 914 to drive one of a pair of drive wheels 910 of the toy. The wheel shafts 912 each have an annular bearing sleeve 920 that engage a bearing aperture 922 formed by the casing 902 and housing 904. In addition, the clutch 916 also has a bearing sleeve that rotates in a bearing aperture formed between the casing and housing cover.

The teeth of drive gear 914 engage the spur gear portion 924 of speed reduction gear 926. A helical gear portion 928 of the speed reduction gear engages a worm gear of motor 908. The worm gear and motor are attached to the housing cover 904 and is not shown in FIG. 10 so as to expose the motor cavity above the plastic mounts 907. The speed reduction gears 926 are on an axle 936 that is held in bearings 938 formed between the casing and housing cover. The axle has an "L" shape with a straight shaft on which the speed reduction gears are mounted, and a bent portion 940 that extends into an aperture in the casing. The bent portion of the axle is held in the aperture so that the axle does not rotate or slide laterally out of place during use.

The gear box 900 is sealed to prevent dirt, water and other debris from entering the casing of the toy and getting into the gear box and electrical motors 908. The motors 908 are contained within the gear box 900. The motors are mounted such that their output shafts are perpendicular to the output shafts 912 of the drive wheels 910 and of the gear shafts 936 within the gear box 900. The output shafts of the motors have worm gears which fit into area 942. These worm gears engage helical gears 928 within the gear box. These helical gears may be similar to the helical gear 100 shown in FIG. 1. Because worm and helical gears are used in tandem, the motor may be mounted within the casing of the toy. Without the worm and helical gear combination, the motors would have to have been mounted sideways within the toy casing and further away from the gears than shown in FIGS. 9 and 10. The advantage provided by the worm gear and helical gear combination is that the motors may be oriented closer to the gears in the gear box and in an arrangement better suited to fit in the interior of the toy casing 902.

Figure 11:
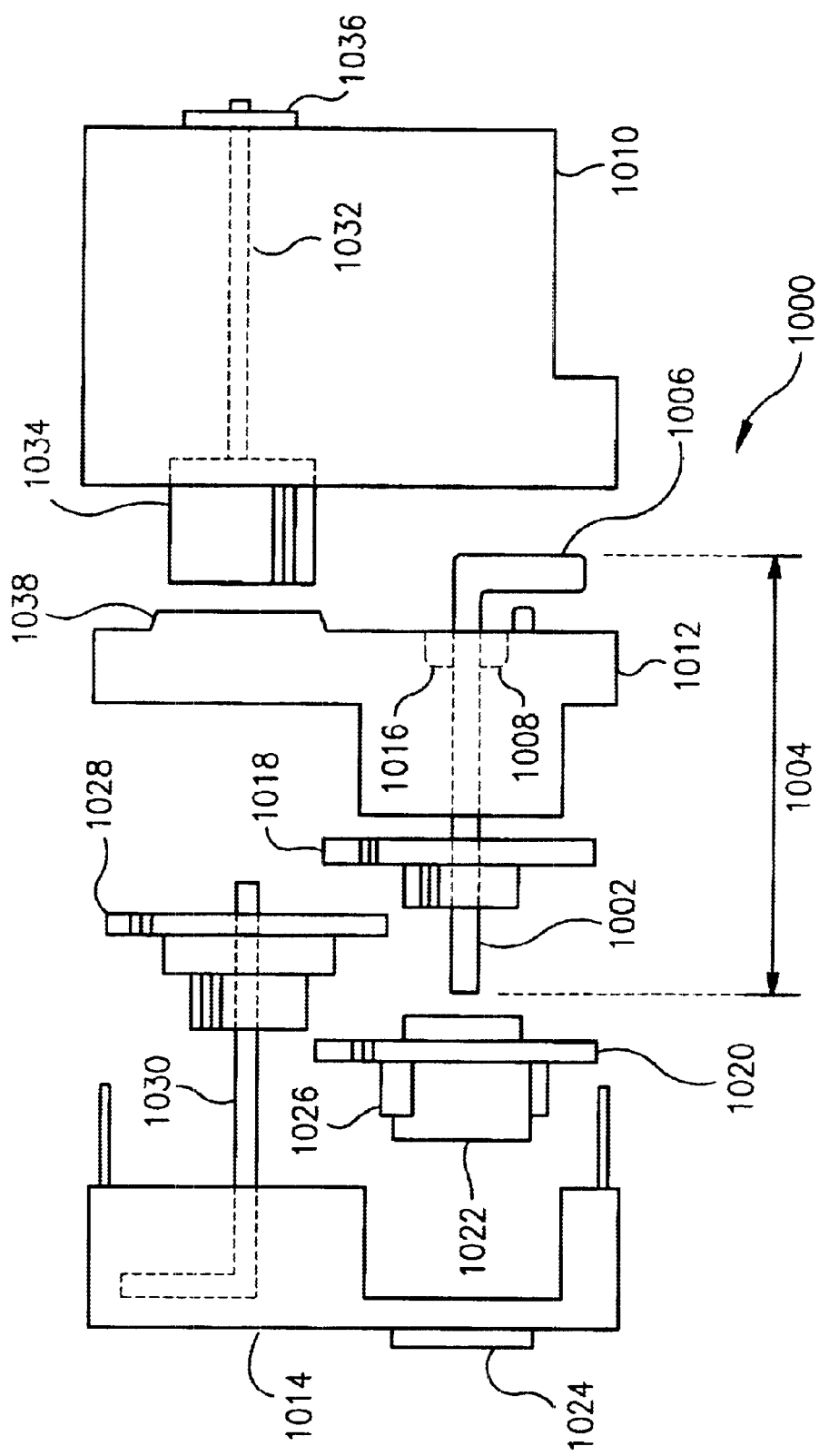
FIG. 11 is an exploded view of a steering gearbox having an L-gear shaft.

FIG. 11 shows a third embodiment of a gear box, the steering gear box 1000, in an exploded view. A feature of this gear box is that the gear shafts 1002 and 1030 is an L-shaped axle. The L-shaped axle has straight gear shaft section 1004 that functions as a typical straight axle gear shaft. In addition, the axle has a bent portion 1006 that may be perpendicular to the remainder portion of the axle 1002.

The purpose of the bent portion is to provide an anchor to prevent rotation of the shaft or movement of the shaft within the gear box. The bent portion 1006 may be held within the gear box by having it fit within a recess in the gear box housing or fit between a pair of posts 1008 on an outer surface of the gear box housing. The posts may be easily formed by plastic injection molding during the molding process of the housing. The posts 1008 on either side of the bent portion 1006 of the axle 1002 prevent the axle from rotating and may pinch the axle to hold it in place.

The gear housing 1000 shown in exploded view in FIG. 11 has a first housing cover 1010 that attaches to a first gear box casing 1012. An opposite gear box casing 1014 connects to the first gear box casing 1012, and the housing cover 1010 to form the gear box 1000. Each of these casings and housing may be formed by plastic injection molding.

The L-shaft 1002 is supported by the first gear box casing 1012. The L-shaft extends through an aperture and a bearing surface 1016, with the bent portion 1006 of the shaft engaging posts 1008 on the outer surface of the gear box casing 1012. The axle section 1002 of the L-shaft extends inwardly into the gear box to form a gear shaft for a spur gear 1018 and an output gear 1020. The output gear has an output shaft 1022 that extends through an output aperture 1024 in the second gear box casing 1014. The output shaft 1022 may have a key 1026 to engage slots within the output aperture 1024 to restrict annular movement of the output gear, e.g., to a range of 30 degrees. In addition, an intermediary gear 1028 links the spur 1018 and output gear 1020. A gear shaft 1030 extending from the second gear casing 1014 supports the intermediary gear. The second gear shaft 1030 is also an L-axle, that engages posts (not shown) on the inside surface of the casing 1014. The bend portions of the L-shaft do protrude through the outside surface of the casing 1012, but that casing 1012 surface is covered by housing 1010. A drive shaft 1032 with a spur gear 1034 may pass through an aperture 1036 in the housing 1010, and through an aperture 1038 in the casing 1012 to engage the spur gear 1018.

Figure 12:
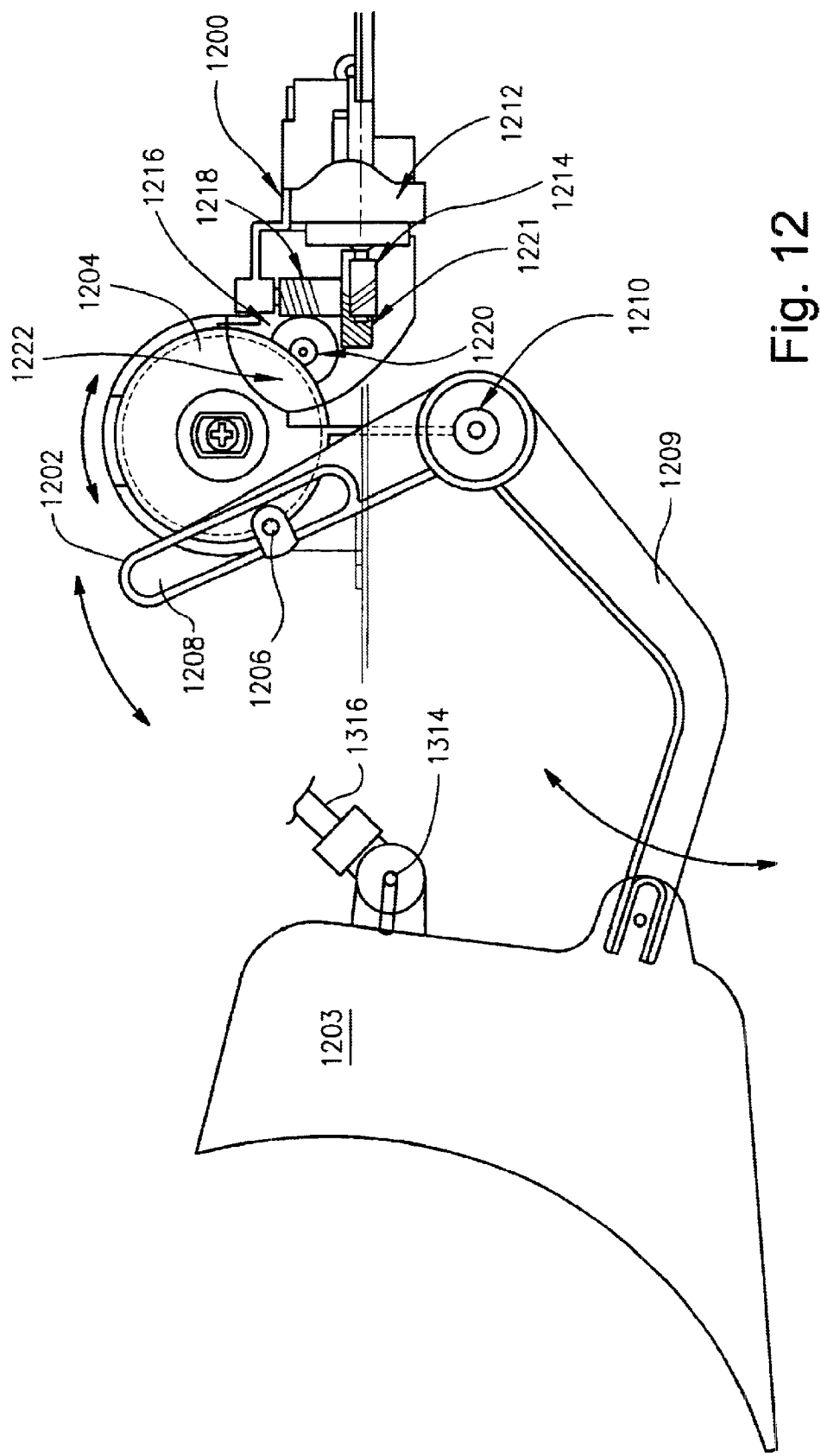
FIG. 12 is a side-interior view of a mechanical shovel, linkage and gear box for a toy bulldozer.

FIG. 12 shows a partial view of a gear box 1200 with linkages 1202 for a shovel 1203 of a bulldozer toy. The gear box houses a motor and gears that turn a pair of disks 1204 (the other disk is hidden in the view of FIG. 12). The disks have a post 1206 that rotates back and forth through an angle of desired shovel movement. The rotation of the disks is restricted by the gear box to the desired shovel angle. As the post 1206 moves through its angle it slides in slot 1208 of the shovel linkage 1202. The angular movement of the post causes the linkage arm 1209 to pivot about pin 1210 (hidden by the casing of the dozer).

The gear box 1200 encases a motor 1212 having an output shaft with a worm gear 1214. The worm gear 1214 rotates a helical gear disk 1221 that has a worm gear 1218. The worm gear 1218 engages a helical gear disk 1216 that has a spur gear disk 1220. The spur gear turns a drive gear 1222 for the disks 1204 that move the linkage for the shovel 1203.

The invention has been described in connection with what is presently considered to be the preferred embodiment. The invention is not limited to the disclosed embodiment. The invention covers various modifications and equivalent arrangements included within the spirit and scope of the appended claims.

What is claimed is:

1. A method for forming a helical gear having a helical gear disk and a smaller straight gear disk comprising:

a. forming a mold cavity for the helical gear having a moving mold section that defines the helical gear disk and a stationary mold section that defines the straight gear disk;

b. injecting liquid plastic into the mold cavity;

c. allowing the injected plastic to cool and solidify in the mold cavity to form the helical gear;

d. separating the mold cavity by splitting the moving mold section from the stationary mold section, and removing the helical gear from the stationary mold section by moving the moving mold section away from the stationary mold section without rotating the moving mold section relative to the stationary mold section;

e. maintaining the helical gear fully in the moving mold section during step (d);

f. ejecting the helical gear from the moving mold section by moving a non-rotating ejector out from the moving mold section and along an axis of the helical gear, wherein an ejection speed is used for the ejector that enables the gear to rotate during ejection from the moving mold section so that helical gear teeth on the helical gear are not damaged during ejection.

2. A method for forming a helical gear as in claim 1 wherein the mold cavity has a mirror smooth surface finish.

3. A method for forming a helical gear as in claim 1 wherein the mold cavity is formed of corrosion resistant, stainless steel.

4. A method for forming a helical gear as in claim 1, further including providing a mold pin that protrudes at least partially through the mold cavity to define a gear shaft aperture in the helical gear.

* * * * *